United States Patent [19]

Kim et al.

[11] 4,418,006

[45] Nov. 29, 1983

[54] HYDROCARBON CONVERSION CATALYST SYSTEM

[75] Inventors: Dae K. Kim, Naperville, Ill.; Ralph J. Bertolacini, Chesterton, Ind.

[73] Assignee: Standard Oil Company, a corporation of Indiana, Chicago, Ill.

[21] Appl. No.: 301,300

[22] Filed: Sep. 11, 1981

Related U.S. Application Data

[62] Division of Ser. No. 170,528, Jul. 21, 1980, Pat. No. 4,325,808.

[51] Int. Cl.$^3$ .................... B01J 29/16; B01J 29/26; B01J 27/10
[52] U.S. Cl. ...................................... 502/73; 502/228
[58] Field of Search ...................... 252/455 Z, 441

[56] References Cited

U.S. PATENT DOCUMENTS

| | | | |
|---|---|---|---|
| 4,077,909 | 3/1978 | Bertolacini et al. | 252/455 Z |
| 4,191,632 | 3/1980 | Cosyns et al. | 252/455 Z |
| 4,191,638 | 3/1980 | Plank et al. | 252/455 Z |
| 4,212,727 | 7/1980 | Antos | 252/455 Z |

*Primary Examiner*—Carl F. Dees
*Attorney, Agent, or Firm*—James R. Henes; William T. McClain; William H. Magidson

[57] ABSTRACT

A hydrocarbon conversion catalyst system comprising a mixture of a first catalyst containing a noble metal component deposed on a refractory inorganic oxide and a second catalyst containing a non-noble metal component deposed on a support containing a refractory inorganic oxide and a crystalline aluminosilicate material, and a reforming method employing such catalyst system are disclosed.

18 Claims, No Drawings

HYDROCARBON CONVERSION CATALYST SYSTEM

This is a division of application Ser. No. 170,528 filed July 21, 1980 and now U.S. Pat. No. 4,325,808.

BACKGROUND OF THE INVENTION

1. Field of the Invention

This invention relates generally to a hydrocarbon conversion catalyst system and a process for reforming hydrocarbons in the presence of such catalyst system, and more particularly concerns a catalyst system comprising a first catalyst having a noble metal component and a second catalyst having a non-noble metal component and a crystalline aluminosilicate component, and a reforming process employing such catalyst system.

2. Description of the Prior Art

The catalytic reforming of hydrocarbon streams is one of the important hydrocarbon conversion processes that can be employed to provide high octane number hydrocarbon blending components for gasoline, as well as aromatics and liquefiable gases. The increasing demand for such materials makes desirable the development and use of improved reforming catalysts which result in enhanced production of high octane number gasoline blending components, light aromatics and liquefiable gases. Efforts to obtain enhanced production of higher octane number gasoline components using conventional platinum-on-alumina reforming catalysts generally result in excessive decrease in the yield of liquid reformate and in the production of increased amounts of non-liquefiable gases. Accordingly, there is a need for hydrocarbon conversion catalysts which are instrumental in producing a reformate having an improved octane value without also effecting an excessive decrease in the yield of liquid reformate and producing increased amounts of non-liquefiable gases.

Relevant hydrocarbon conversion catalyst comprising a physical mixture of components are disclosed in Kittrell, U.S. Pat. No. 3,535,231. The Kittrell patent discloses a process for the conversion of distillates and solvent-deasphalted residua employing a catalyst consisting of a physical mixture of particles of a first catalyst and of a second catalyst. The first catalyst comprises a layered clay-type crystalline aluminosilicate material and a component selected from rhenium and compounds of rhenium. The second catalyst comprises a layered clay-type crystalline aluminosilicate material, a component selected from Group VIII metals and compounds thereof, and a component selected from the group of silica-alumina gel, silica-alumina-titania gel, and silica-aluminazirconia gel. The mixtures are disclosed as being useful in hydrocracking, hydrodesulfurization, hydrodenitrification, hydrogenation, and hydroisomerization processes. However, Kittrell neither discloses nor suggests that his catalyst system would be useful in reforming operations. The layered clay-type crystalline aluminosilicates of Kittrell are in fact of insufficient pore size to be useful in reforming operations.

Relevant reforming catalysts are disclosed in Roberts et al., German Offenlegungsschrift No. P 2,627,822. The Roberts et al. German Offenlegungsschrift discloses a reforming catalyst comprising a mixture of platinum, palladium, iridium, rhodium, gallium, germanium or tin or compounds thereof, on a first solid support and a rhenium-containing component on a second solid support. However, unlike the present invention, this German application does not disclose the presence of a crystalline aluminosilicate component in the second solid support and the only solid supports disclosed are the inorganic oxides gamma-alumina and eta-alumina. In addition, the only benefit disclosed for the catalyst system of the German application is the maintenance of the yield of a higher octane reformate from the initial period of operation and through longer periods of operation by reducing hydrocracking reactions. Furthermore, relative to the case of the present invention, this benefit is achieved at relatively lower octane numbers and at relatively higher reforming temperatures and occurs primarily with feeds containing relatively high sulfur contents.

Copending patent application Ser. No. 86,707, of Pellet et al., filed Oct. 22, 1979 now U.S. Pat. No. 4,302,358, is directed to similar subject matter. Pellet et al. disclose that it is possible to improve the reforming activity of catalysts comprising a first compound comprising at least one Group VIII noble metal deposed on a solid catalyst support having acidic catalyst sites and a second component comprising rhenium or a compound thereof deposed on a solid catalyst support material. Pellet et al. point out that surprisingly, other things being equal, there is a substantial activity increase by thoroughly and intimately blending finely-divided particles of the first and second components to provide a thoroughly-blended composite and subsequently forming the composite into larger particles, in contrast to using only a particulate mixture of first and second catalyst components. The Pellet et al. catalysts have the additional advantage that they are even more effective in reforming high sulfur feeds than the catalysts of German Offenlegungsschrift No. P 2,627,822.

It is known that improved octane values can be obtained by employing novel catalysts in the tail reactor of a reforming operation. For example, each of Bertolacini et al., U.S. Pat. Nos. 3,772,183; 3,772,184; 3,798,154 and 4,134,823 discloses a reforming process which comprises contacting a novel catalyst composition disclosed therein with a hydrocarbon stream which had been partially reformed in the presence of a conventional reforming catalyst. However, none of these patents disclose the physical mixture of catalysts which is employed in the catalyst system of the present invention and which is essential to achieve the benefits as described hereinbelow of the present invention.

OBJECTS OF THE INVENTION

It is therefore a general object of the present invention to provide a hydrocarbon conversion catalyst system and reforming process employing such catalyst system which results in the production of a reformate having an improved octane value without an excessive yield loss. A related object of the present invention is to provide an improved hydrocarbon conversion catalyst system and reforming process employing such catalyst system which results in improved yields of liquefiable hydrocarbon gases without a corresponding increase in the yield of non-liquefiable gaseous reforming products. Similarly it is an object of the present invention to provide a hydrocarbon conversion catalyst system and reforming process employing such catalyst system which results in improved yields of xylenes which are useful as chemical feedstocks. Other objects and advantages of the present invention will become apparent upon reading the following detailed description and appended claims.

SUMMARY OF THE INVENTION

These objects are achieved by the improved hydrocarbon conversion catalyst system of the present invention which comprises a physical particle-form mixture of first and second catalysts. Surprisingly we have found that by modification of the catalyst of the aforesaid Roberts et al., German Offenlegungsschrift No. P 2,627,822 by incorporating thereinto a crystalline aluminosilicate component, we can achieve the aforesaid objects. However, even more surprisingly, we have found that the benefits of the present invention cannot be realized unless the noble metal and crystalline aluminosilicate are physically separated in our catalyst system. If the noble metal and crystalline aluminosilicate are not separated, the yield of $C_{5+}$ liquid product, the relative catalyst activity, the overall aromatics yield, the yields of xylene and benzene and the proportions of propane and isobutane in the gaseous products are not as great as when they are separated. Furthermore, physical separation of the noble metal component from the crystalline aluminosilicate component makes possible the use of higher contents of crystalline aluminosilicate and hence permits greater catalytic activity under reforming conditions of lower severity.

Thus, the first catalyst of the catalyst system of this invention comprises at least one noble metal component and a combined halogen deposed on a high surface area, porous refractory inorganic oxide and is free of a crystalline aluminosilicate component. The second catalyst comprises at least one non-noble metal component deposed on a solid support comprising the cation-exchanged form of crystalline aluminosilicate dispersed in a high surface area, porous refractory inorganic oxide and is free of a noble metal component. Each noble metal component in the first catalyst comprises a noble metal, a compound thereof or a mixture thereof. Each non-noble metal component of the second catalyst consists essentially of a member selected from the group consisting of chromium, gallium, germanium, indium, lead, manganese, rhenium, technetium, thallium, tin, tungsten, a compound thereof and a mixture thereof.

The weight percent of each noble metal component, calculated as the noble metal element therein and based on the weight of the first catalyst of the catalyst system of the present invention, is in the range of from about 0.10 to about 1. The weight percent of each combined halogen, calculated as the halogen element therein and based on the weight of the first catalyst of the catalyst system of the present invention, is in the range of from about 0.1 to about 1. The weight percent of each non-noble metal component in the second catalyst, calculated as the non-noble metal element therein and based on the weight of the second catalyst of the catalyst system of the present invention, is in the range of from about 0.1 to about 5. The weight percent of the crystalline aluminosilicate material in the second catalyst of the catalyst system of the present invention is in the range of from about 1 to about 80. The weight ratio of the first catalyst to the second catalyst in the catalyst system of the present invention is in the range of from about 1:1 to about 10:1.

The present invention is also a process for reforming a hydrocarbon stream comprising contacting the hydrocarbon stream in a reforming zone under reforming conditions and in the presence of hydrogen and the aforesaid hydrocarbon conversion catalyst system of the present invention. In a preferred embodiment, the present invention is a process for reforming a partially reformed hydrocarbon stream comprising contacting the hydrocarbon stream in a reforming zone under reforming conditions and in the presence of hydrogen and the aforesaid hydrocarbon conversion catalyst system of the present invention. In a more preferred embodiment, the present invention is a process for reforming a hydrocarbon stream comprising contacting the hydrocarbon stream in a first reforming zone under reforming conditions and in the presence of hydrogen and a catalyst comprising a noble metal component deposed on a porous refractory inorganic oxide, to produce a reformate, and subsequently contacting the reformate in a second reforming zone under reforming conditions and in the presence of hydrogen and the aforesaid hydrocarbon conversion catalyst system of the present invention.

DETAILED DESCRIPTION OF THE PREFERRED EMBODIMENTS

The catalyst system of the present invention comprises a mixture of two different types of catalysts. The first type of catalyst comprises at least one noble metal or compound thereof or mixtures thereof, and combined halogen deposed on a high surface area, porous refractory inorganic oxide solid support and is free of a crystalline aluminosilicate component. Suitable noble metals are platinum, palladium, ruthenium, rhodium and iridium. Preferably the noble metal is platinum. Typically the noble metal compound is an oxide or sulfide of the noble metal. Suitably, the combined halogen is chlorine or fluorine. The preferred combined halogen is chlorine.

In addition, at least one non-noble metal or compound thereof or mixture thereof, which is compatible with the noble metal component and which either is itself a reforming catalyst or promotes the activity of the noble metal component can also be deposed on the solid support of the first type of catalyst. Suitable such non-noble metal-containing materials are well known in the art. The preferred non-noble metal in the first type of catalyst is rhenium. Typically the non-noble metal compound is an oxide or sulfide of the non-noble metal. More preferably, platinum and rhenium components are deposed on the solid support in the first type of catalyst.

Suitable high surface area, porous refractory inorganic oxides for use as the solid support in the first type of catalyst comprise an oxide of a single metal or a mixture of the oxides of two or more metals. Thus, the porous refractory inorganic oxide that is employed in the first type of catalyst in the catalyst system of the present invention can typically be catalytically active alumina, silica-alumina, silica-magnesia, titania-alumina, zinc oxide-alumina, boriatitania-alumina and the like. Such refractory oxides should have an average pore diameter of from about 50 Angstroms to about 200 Angstroms and a surface area of at least about 100 square meters per gram and preferably in the range of from about 200 square meters per gram to about 500 square meters per gram. Catalytically active alumina, such as gamma-alumina or eta-alumina, is the preferred refractory inorganic oxide.

An example of the refractory inorganic oxide in the first type of catalyst in the catalyst system of the present invention is PHF or Aero-1000 Alumina manufactured by American Cyanamid Co. It is described as a high-purity gamma-alumina, with its inspection data being: a surface area of 206 square meters per gram, a pore volume of 0.6 cubic centimeter per gram, an average pore diameter of 90 Angstroms, a sodium content of 0.1 weight percent, a silicon content of 0.02 weight percent and an iron content of 0.025 weight percent.

The weight percent of each noble metal or compound thereof, calculated as the noble metal element and based on the weight of the first type of catalyst, is in the range of from about 0.10, and preferably from about 0.20, to about 1.0, and preferably to about 0.80. The weight percent of each combined halogen, calculated as the halogen element and based on the weight of the first type of catalyst, is in the range of from about 0.1, and preferably from about 0.2, to about 1.0, and preferably to about 0.80. The weight percent of each non-noble metal component, calculated as the non-noble metal element and based on the weight of the first type of catalyst, is in the range of from about 0.10, and preferably from about 0.20, to about 2.0, and preferably to about 0.80.

The second type of catalyst of the catalyst system of the present invention comprises at least one non-noble metal or compound thereof or mixtures thereof deposed on a high surface area, porous solid support comprising the cation-exchanged form of a crystaline aluminosilicate material dispersed in a porous refractory inorganic oxide, and is free of a noble metal component. Suitable non-noble metals include chromium, gallium, germanium, indium, lead, manganese, rhenium, technetium, thallium, tin and tungsten. The preferred non-noble metal is gallium, rhenium or tungsten. More preferably, the non-noble metal is rhenium. Typically the non-noble metal compound is an oxide or sulfide of the non-noble metal.

The solid support in the second type of catalyst of the catalyst system of the present invention comprises a large-pore, crystalline aluminosilicate material and a suitable high surface area, porous refractory inorganic oxide. Preferably, the crystalline aluminosilicate material is suspended in and distributed throughout the matrix of the refractory inorganic oxide.

By large-pore material is meant a material that has pores which are sufficiently large to permit the passage thereinto of benzene molecules and larger molecules, and the passage therefrom of reaction products. For use in catalysts that are employed in petroleum hydrocarbon conversion processes, it is preferred to employ a large-pore crystalline aluminosilicate material having a pore size of at least 6 to 10 Angstrom units.

The crystalline aluminosilicate component can be natural or synthetic and can suitably be mordenite, faujasite and ferrierite. The aluminosilicate material that is employed in the support of the second type of catalyst is preferably mordenite. Mordenite is a large-pore aluminosilicate material. While mordenite is naturally occurring, a synthetic mordenite-type aluminosilicate material known as Zeolon is commercially available from the Norton Chemical Company. Zeolon-H is the hydrogen form of this synthetic mordenite. Mordenite is characterized by its high silica-to-alumina ratio and its crystal structure. Mordenite can have a silica-to-alumina ratio within the range of about 6 to about 100. The composition of mordenite is given in Kirk-Othmer, *Encyclopedia of Chemical Technology*, first edition, Volume 12, page 297 (1954), as $(Ca, Na_2)Al_2Si_9O_{22}\cdot 6H_2O$. The proposed structure is one in which the basic building block is a tetrahedron consisting of 1 silicon or aluminum atom surrounded by four oxygen atoms. The crystal structure is made up of chains of 4- and 5-membered rings of these tetrahedra. These 4- and 5-membered rings are believed to give the structure its stability. The chains are linked together to form a network having a system large parallel channels interconnected by small cross channels. Rings of 12 tetrahedra form the large channels. Other synthetic zeolites also have such 12-membered rings, but they have interconnected cages, whereas the mordenite has parallel chains of uniform diameter. For example, synthetic faujasite, which has the formula $Na_3Al_3Si_4O_{14}$, is characterized by a 3-dimensional array of pores which consist of 12–13 Anstrom cages interconnected through 8–9 Angstrom windows.

The exchangeable metal cations, such as sodium ions, of the crystalline aluminosilicate in the second type of catalyst of the catalyst system of the present invention are replaced or cation-exchanged with any suitable cation such as an alkaline earth metal, a rare earth metal, hydrogen, or a hydrogen precursor, to provide an alkali metal content in the crystalline aluminosilicate that is less than 1 weight percent, calculated as the alkali metal element. Preferably, the exchangeable alkali metal cations are replaced by hydrogen ions. Ammonium ions comprise a hydrogen precursor and may be employed to cation-exchange the alkali metal of the mordenite. Heat is employed to drive off ammonia leaving the crystalline aluminosilicate in the hydrogen form.

Mordenite differs from other aluminosilicates in that substantially all the exchangeable metal cations may be replaced with hydrogen ions without causing destruction of the characteristic crystal structure of the mordenite. The mordenite aluminosilicate material that is preferred, the Zeolon manufactured by the Norton Chemical Company, with its high ratio of silica to alumina, exhibits the ability to undergo complete acid exchange from the original sodium form to the hydrogen form. The theoretical silica-to-alumina ratio is about 10 to 1 and the effective pore diameter is within the range of 6 to 9 Angstroms. The surface area in square meters per gram is within the range of 400–450 square meters per gram, and its static water capacity is within the range of 10–11 weight percent.

Suitable high surface area, porous refractory inorganic oxides for use in the solid support of the second type of catalyst in the catalyst system of the present invention comprise an oxide of a single metal or a mixture of the oxides of two or more metals. Thus, the porous refractory inorganic oxide that is employed in the second type of catalyst in the catalyst system of the present invention can typically be catalytically active alumina, silica-alumina, silica-magnesia, titania-alumina, zinc oxide-alumina, boria-titania-alumina, and the like. Such refractory oxides should have an average pore diameter of from about 50 Angstroms to about 200 Angstroms and a surface area of at least 100 square meters per gram. Preferably, the surface area should be within the range of from about 200 square meters per gram to about 500 square meters per gram. Catalytically active alumina, such as gamma-alumina and eta-alumina, is the preferred refractory inorganic oxide.

An example of the refractory inorganic oxide component that is employed in the second type of catalyst in the catalyst system of this invention is PHF or Aero 1000 Alumina manufactured by American Cyanamid Co.

The weight percent of each non-noble metal or compound thereof in the second type of catalyst, calculated as the non-noble metal element and based on the weight of the second type of catalyst in the catalyst system of the present invention, is in the range of from about 0.1, preferably from about 0.5, to about 5.0, and preferably to about 3. The weight percent of crystalline aluminosilicate in the second type of catalyst is in the range of from about 1.0, and preferably from about 2.0, to about 80, and preferably to about 60. Physical separation of the noble metal component (in the first type of catalyst) from the crystalline aluminosilicate component (in the second type of catalyst) makes possible the use of higher contents of crystalline aluminosilicate and hence permits greater catalytic activity under reforming conditions of lower severity.

The weight ratio of catalyst of the first type mixed with catalyst of the second type in the catalyst system of this invention is in the range of from about 1:1 to about 10:1. An inert diluent can also be present in the catalyst system of the present invention.

The first and second types of catalysts in the catalyst system of the present invention can be prepared in various ways that are well known in the art. For example, for the first type of catalyst, soluble compounds of the aforesaid noble metal(s) and, if used, non-noble metal(s) and of the halogen(s) can be added to a sol or gel of the refractory inorganic oxide. This composition is thoroughly blended, and the sol or gel mixture is subsequently co-gelled by the addition of a dilute ammonia solution. The resulting co-gelled material is then dried and calcined. In another method of preparation of the first type of catalyst, the refractory inorganic oxide is gelled, dried, pelleted, calcined, and cooled, and the resulting material is then impregnated with one or more solutions of the noble metal(s) and, if used, non-noble metal(s) and the halogen(s). Each combined halogen may be incorporated into the catalyst as a halide of a metal, or as a halogen acid, or as a halide salt. Each combined halogen can be added prior to, after, or simultaneously with the noble metal and/or, if used, the non-noble metal.

The second type of catalyst in the catalyst system of the present invention can also be prepared in various ways. For example, finely-divided aluminosilicate material which has already been cation-exchanged to reduce its sodium content to the desired level, can be stirred into a sol or gel of the refractory inorganic oxide and at least one soluble compound of at least one of chromium, gallium, germanium, indium, lead, manganese, rhenium, technetium, thallium, tin and tungsten is added to the sol or gel, followed by the co-gelling of the sol or gel mixture and by the addition of dilute ammonia. The resulting co-gelled material is then dried and calcined.

In another method of preparation of the second type of catalyst in the catalyst system of the present invention, finely divided crystalline aluminosilicate material which has already been cation-exchanged to reduce its sodium content to the desired level, is mixed into a sol or gel of the refractory inorganic oxide, the sol or gel mixture is co-gelled by the addition of dilute ammonia and the resulting gel is subsequently dried, pelleted, calcined, cooled, and then impregnated with a solution or solutions of at least one soluble compound of at least one of chromium, gallium, germanium, indium, lead, manganese, rhenium, technetium, thallium, tin and tungsten. As an alternate method of preparation, a hydrogel of the refractory inorganic oxide is blended with finely divided crystalline aluminosilicate which has already been cation-exchanged to reduce its sodium content to the desired level, and a solution or solutions of at least one soluble compound of at least one of chromium, gallium, germanium, indium, lead, manganese, rhenium, technetium, thallium, tin and tungsten are added to this blend, and the resulting mixture is thoroughly blended. The blended mixture is then dried, pelleted, and calcined.

The second type of catalyst of the catalyst system of the present invention can be prepared in several additional ways. For example, the large-pore crystalline aluminosilicate material which has already been cation-exchanged to reduce its sodium content to the desired level, can be pulverized into a finely divided state and then physically admixed with a finely divided powder of the selected refractory inorganic oxide component. After a thorough blending of the two solid components, the resulting mixture can be co-pelleted, and impregnated with one or more solutions of at least one of the metals of the aforesaid non-noble metal component(s). The resulting composition is thoroughly mixed to form a blended composition, which is subsequently dried to a moisture content ranging from about 20 to 40 weight percent, based upon the total weight of the composition. The dried material is then calcined at a temperature within the range of about 900° F. (482° C.) to about 1,100° F. (593° C.)

The following is another method of preparation. The large-pore crystalline aluminosilicate material, which has already been cation-exchanged to reduce its sodium content to the desired level, in a finely divided state may be added to a hydrosol or a hydrogel of the refractory inorganic oxide component and blended therein to form a homogeneous mixture. The non-noble metal component(s) is added in the form of a heat-decomposable component(s) to this homogeneous mixture. This heat-decomposable component can be added in a single solution or in several solutions. The resulting composition is then thoroughly mixed, dried, and calcined, as described above.

Alternatively, the homogeneous mixture of the above paragraph can be dried and pelleted, or dried, and the resulting material may be impregnated with the non-noble metal component(s), followed by drying and calcining, as described above.

In each of the above preparations of the second type of catalyst, the crystalline aluminosilicate material employed is one which has previously been cation-exchanged. A suitable cation-exchange procedure comprises making a slurry of the aluminosilicate material in a solution of a cation, such as ammonium ions, which is to be exchanged with the alkali metal in the aluminosilicate material, stirring the slurry at a temperature of about 100° C. for at least about 2 hours to about one week, filtering the slurry, washing the filtered solid with distilled water, and drying and calcining the solid.

Suitable drying conditions for use in the above described methods for making the first and second types of catalysts of the catalyst system of the present invention comprise a temperature in the range of from about 200° F. (93° C.) to about 400° F. (204° C.) and a drying time of from about 5 to about 30 hours. Suitable calcination conditions in such methods comprise a temperature in the range of about 900° F. (482° C.) to about 1,400° F. (760° C.) and a calcination time of from about 2 to about 20 hours. Preferred drying and calcination conditions are a temperature of about 250° F. (121° C.) for about 16 hours and a temperature of about 1,000° F. (538° C.) for about 6 hours, respectively.

A mechanical mixture of first particles consisting essentially of the first type of catalyst and of second particles consisting essentially of the second type of catalyst is then prepared. Appropriately sized first and second particles are added to one another and are thoroughly blended. Each of the first particles consisting essentially of the first catalyst has a particle size of from about 0.031 inch (0.0787 cm.) to about 0.188 inch (0.477 cm.), and preferably to about 0.0833 inch (0.217 cm.), in its largest dimension. Each of the second particles consisting essentially of the second catalyst has a particle size within the same ranges. The first and second types of particles can be thoroughly and intimately blended by using techniques, such as mulling or ball-milling, which are well known in the art. The resulting mixture can be used as such and can be charged to a reactor.

Alternatively, a more intimate mixture may be prepared by the method disclosed in detail in Pellet et al., copending Application Ser. No. 86,707, filed on Oct. 22, 1979 now U.S. Pat. No. 4,302,358, which in its entirety is specifically incorporated herein by reference. Following the method of Pellet et al., the aforesaid first and second particles are reduced to smaller particle sizes and the resulting smaller particles are thoroughly blended to form a thoroughly blended composite, which in turn is formed into relatively larger particles, one portion of each of which consists essentially of the first catalyst and a second portion of each of which consists essentially of the second catalyst. These relatively larger particles have sizes within the aforedescribed ranges for the aforesaid first and second particles. A suitable procedure for making such relatively larger particles comprises forming cylindrical pellets from the thoroughly blended composite by extrusion, and charging the extruded pellets into a Marumerizer, wherein the pellets are transformed into uniform-sized spheres by means of a rolling motion resulting from centrifugal force and friction. The Marumerizer (a registered trademark) is a machine consisting of a non-movable bowl inside of which bowl is a specially machined rotating friction plate. It can be obtained from Elanco Products Company, Equipment Sales Department, a Division of Eli Lilly and Company. Other methods known in the art can be used to form larger particles comprising a thoroughly-blended composite of smaller particles. The larger particles can be made in the shape of extrudates, pills, pellets, beads, spheres, or other shaped particles of the desired size.

The catalyst system of the present invention is suitable for the conversion of hydrocarbon streams. Such hydrocarbon streams can be derived from petroleum or from the direct or indirect liquefaction of solid carbonaceous materials such as coal, tar sands, oil shale, biomass and the like. In particular, it is ideally employed for the reforming of hydrocarbon naphthas and those hydrocarbon streams boiling in the gasoline boiling range by the method of this invention. Typically, a naphtha will have a boiling range within about 70° F. (21° C.) to about 500° F. (260° C.), and preferably within about 180° F. (82° C.) to about 400° F. (204° C.). The gasoline boiling range comprises temperatures about 120° F. (49° C.) to about 420° F. (216° C.), preferably about 140° F. (60° C.) to about 380° F. (193° C.).

Use of the catalyst system of the present invention in reforming results in the formation of a liquid reformate of improved octane value over that formed using a conventional platinum-and-chloride-on alumina reforming catalyst and does so without incurring an excessive loss in the yield of liquid reformate. Use of the catalyst system of the present invention in reforming also results in a selective increase in the yield of liquefiable gases relative to the yield from the use of the aforesaid conventional reforming catalyst, without a corresponding increase in the yield of non-liquefiable gaseous reforming products. Furthermore, use of the catalyst system of the present invention affords an increase in the yield of aromatics in the reformate by enhanced transalkylation, disproportionation, dehydrocyclization and reduced hydrocracking, relative to the yield from the use of the aforesaid conventional reforming catalyst.

These benefits result from the use of the mixture of the first and second catalysts of the catalyst system of the present invention, as is illustrated clearly in the Examples hereinbelow. Use of the mixture of the first and second catalysts of the first system of the present invention results in yields of greater proportions of propane and isobutane in the gaseous reforming products and in yields of liquid reformates having higher research octane numbers under a given set of reforming conditions, than when either the first catalyst (that is, a conventional reforming catalyst) or the second catalyst of the catalyst system of the present invention is employed alone. These benefits are also obtained from the use of the catalyst system of this invention, relative to the use of the first catalyst of the present invention modified to include a crystalline aluminosilicate component. Furthermore, the decrease in the yield of liquid reformate resulting from the use of the catalyst system of this invention relative to the conventional reforming catalyst is less than the corresponding decreases resulting from the use of the second catalyst alone and from that of the first catalyst modified to include crystalline aluminosilicate.

While not intending to be limited by any theory or explanation, it is believed that the presence of the second catalyst in the catalyst system of this invention provides transalkylation, disproportionation and dehydrocyclization activity, to which the enhanced relative yields of aromatics generally and of benzene and xylenes in particular, from the use of the catalyst system of this invention are attributed. The presence of the aforesaid second catalyst in the catalyst system of this invention is believed to promote the transalkylation of toluene with aromatic components containing nine carbon atoms to form xylenes and the disproportionation of toluene to form benzene and xylenes. The dehydrocyclization activity and reduced hydrocracking activity of the second catalyst is also believed to account for a higher aromatics yield. Thus, the presence of the second catalyst in the present catalyst system permits the aromatic composition of the reformate to be altered. Similar benefits are not obtained using only the first catalyst of the present invention or the first catalyst modified to include a crystalline aluminosilicate component.

According to the reforming process of the present invention, there is provided a process for reforming a hydrocarbon stream, which process comprises contacting the hydrocarbon stream in a reforming zone under reforming conditions and in the presence of hydrogen with the catalyst system described hereinabove. This catalyst system is particularly effective for converting the heavy paraffins remaining in a reformate under less severe conditions. Therefore, a preferred embodiment of the process of the present invention is a process which employs a catalyst comprising a conventional reforming catalyst, such as the first type of catalyst of the catalyst system of this invention, in a first reforming zone and the mixture of the first and second catalysts in the catalyst system of the present invention in a second reforming zone. For selected conditions and selected feedstocks, it is contemplated that the first reforming zone would constitute at least two reactors and the second reforming zone would constitute at least one reactor. Still more particularly, a conventional reforming catalyst, such as the first type of catalyst of the catalyst system of this invention, is employed in all of the reactors of a reforming system except the tail reactor, and the mixture of the first and second catalysts of the catalyst system of the present invention is employed in the tail reactor. In an alternative embodiment of the process of the present invention, the reforming system could comprise one or more reactors containing the mixture of the first and second catalysts of the catalyst system of the present invention and making up the sole reaction zone. To this latter embodiment, a partially-reformed naphtha would be the ideal feedstock. The partially-reformed hydrocarbon streams will exhibit an unleaded research octane number within the range of about 75 to about 95.

Since many of the above feedstocks may contain appreciable amounts of nitrogen and sulfur compounds, which may be deleterious to the catalyst system of the present invention, it is preferred that the feedstock in this case is often subjected to a suitable hydrodesulfurization and/or hydrodenitrogenation treatment, such as hydrofining, prior to use in the embodiment of the process of the present invention in order to reduce both the nitrogen and sulfur levels to tolerable limits. Nevertheless, the catalyst system of the present invention is less sensitive to the sulfur content of the feedstock than are the conventional platinum-rhenium-on-alumina catalysts.

Typical operating conditions for the reforming process of the present invention comprise an average catalyst temperature of about 750° F. (399° C.) to about 1,050° F. (566° C.), a pressure of from about 65 pounds per square inch absolute (psia) (4.42 atmospheres) to about 1,000 psia (68 atmospheres), a weight hourly space velocity (WHSV) of from about 0.5 to about 10 weight units of hydrocarbons per hour per weight unit of catalyst, and a hydrogen addition rate of from about 1,500 standard cubic feet per barrel (SCFB) (252.8 liters of hydrogen per liter of feed) to about 15,000 SCFB (2528 liters of hydrogen per liter of feed). Preferred reforming conditions comprise an average catalyst temperature of from about 800° F. (427° C.) to about 1,000° F. (538° C.), a pressure of from about 115 psia (7.82 atmospheres) to about 465 psia (31.6 atmospheres), a WHSV of from about 0.9 to about 4 weight units of hydrocarbons per hour per weight unit of catalyst, and a hydrogen addition rate of from about 2000 SCFB (336 liters of hydrogen per liter of feed) to about 6000 SCFB (1011 liters of hydrogen per liter of feed). These operating conditions are appropriate for each reforming zone of the multiple-zone embodiment of the process of the present invention.

The process of the present invention can be carried out in any of the conventional types of equipment known to the art. One may, for example, employ a conventional reforming catalyst system and/or the catalyst system of the present invention in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. A fixed-bed reforming process is exemplified by Ultraforming (Petroleum Engineer, vol. XXVI, No. 4, April 1954, at page C-35). Alternatively, such catalyst systems can be suitable for use in moving beds, in which the charging stock and reforming catalyst system are preferably passed in countercurrent flow. In addition, there can be used either fluidized-solid processes in which the charging stock is passed upward through a turbulent bed of finely divided reforming catalyst, or the suspensoid process in which the reforming catalyst system is slurried in the charging stock and the resulting mixture is conveyed into the reaction zone.

The reaction products from the tail reactor of any of the foregoing reforming process variations are separated from the reforming catalyst therein and fractionated to recover the various components thereof. The hydrogen and unconverted materials are recycled as desired, the excess hydrogen produced in the reformer conveniently being utilized in the hydrodesulfurization of the feed.

Unwanted products in the reforming of hydrocarbon streams are light hydrocarbon gases and coke. Compounds such as polynuclear aromatics and heavy hydrocarbons in the feed result in coke. Thus, as the operation progresses, a substantial amount of coke accumulates on the surface of the catalyst particles, resulting in an increasingly rapid rate of deactivation of the catalyst system. Consequently, the catalyst system must be regenerated periodically to remove coke from the surface of the catalyst particles. Typically, the gas will contain oxygen within the range of from about 1.0 volume percent to about 21 volume percent. The concentration of oxygen in the gas should be maintained at a level which will result in the production of temperatures that will not be in excess of 1,100° F. (593° C.), preferably not in excess of 1,050° F. (566° C.). The catalyst system of the present invention is capable of being regenerated and of withstanding the conditions employed in the regeneration treatment.

In a typical embodiment of the method of the present invention, a feed comprising a naphtha heart cut, having a boiling range of about 160° F. (71° C.) to about 400° F. (204° C.), preferably about 180° F. (82° C.) to about 380° F. (193° C.), is mixed with hydrogen-containing recycle gas, and the resulting hydrogen-hydrocarbon mixture is introduced into a first reactor at a temperature of about 940° F. (504° C.). The pressure in the first reactor is within the range of about 345 psia (23.5 atmospheres) to about 365 psia (24.8 atmospheres), and the effluent from the first reactor is at a temperature of approximately 760° F. (404° C.).

The effluent from the first reactor is then heated to a temperature of approximately 960° F. (516° C.) and then is introduced into a second reactor. The pressure in the second reactor is within the range of about 335 psia (22.8 atmospheres) to about 355 psia (24.1 atmospheres), and the effluent from the second reactor is at a temperature of approximately 855° F. (457° C.).

The effluent from the second reactor is then heated to a temperature of approximately 960° F. (516° C.) and introduced into a third reactor. The pressure in the third reactor is within the range of about 325 psia (22.1 atmospheres) to about 345 psia (23.5 atmospheres), and the effluent from the third reactor is at a temperature of approximately 920° F. (493° C.).

The effluent from the third reactor is heated to a temperature of about 940° F. (504° C.) and introduced into a fourth or tail reactor. The pressure in the tail reactor is within the range of about 315 psia (21.4 atmospheres) to about 335 psia (22.8 atmospheres), and the effluent from the tail reactor is at a temperature of about 920° F. (493° C.).

Each of the first three reactors contains a conventional reforming catalyst comprising platinum and chloride on a support of catalytically active alumina. In general, this catalyst contains about 0.1 to about 2 weight percent platinum and about 0.1 to about 5 weight percent chloride, preferably about 0.4 to about 1 weight percent chloride. The catalyst may be promoted by a small amount of rhenium. The fourth or tail reactor in the system contains a physical mixture of the first and second types of catalysts of the catalyst systems of this invention. First particles consisting essentially of the first type of catalyst in the tail reactor have the same composition as the conventional reforming catalyst used in the aforesaid first three reactors. Second particles consisting essentially of the second type of catalyst in the tail reactor comprise about 1.0 weight percent of rhenium on a solid support of 60 weight percent Zeolon-H dispersed in and suspended throughout a matrix of catalytically active alumina, these percentages being based on the weight of the second type of particles in the tail reactor.

The hydrogen-hydrocarbon ratio and the WHSV employed in the various reactors fall within the respective ranges of values as expressed hereinabove.

The effluent from the tail reactor is cooled and separated into its liquid and gaseous fractions. The resulting liquid fraction is sent to a suitable product recovery system from which a high octane number product is obtained. A portion of the gaseous fraction is removed to be used at other refinery units or elsewhere. The remainder of the gaseous fraction is compressed to be recycled as hydrogen-hydrocarbon recycle gas. When necessary, make-up hydrogen gas may be introduced into the system.

The present invention will be more clearly understood from the following specific examples.

EXAMPLE 1

Reforming catalyst particles containing 0.74 weight percent of platinum and 0.77 weight percent of chloride on a gamma-alumina solid support are commercially available and were obtained from American Cyanamid Company. These particles had a surface area of 186 square meters per gram and were crushed to a mesh size of 20-40 (U.S. Sieve Series).

EXAMPLE 2

A solid support containing 2 weight percent of the hydrogen-exchanged form of mordenite dispersed in alumina was prepared. 3340 grams of American Cyanamid's alumina sol containing 15 weight percent of alumina was stirred vigorously to a thin and fluid consistency in a blender. The hydrogen-exchanged form of mordenite as a powder containing 12.5 weight percent of moisture was obtained as Zeolon 100 from Norton Chemical Company, and 11.7 grams of Zeolon 100 was slurried in 150 milliliters of distilled water. The resulting slurry was thoroughly mixed with the alumina sol by vigorous stirring in a blender. The resulting mixture was gelled with 300 milliliters of a solution containing 10 weight percent of ammonium hydroxide in water. The gel was dried in air first at 250° F. (121° C.) for 18 hours and next at 400° F. (204° C.) for 2 hours and then was calcined in air at 1000° F. (538° C.) for 3 hours. The resulting calcined support contained 2 weight percent of Zeolon 100 dispersed in alumina.

A portion of the calcined support was ground to a particle size of 20-40 mesh, and 100 grams of the ground support was impregnated with 200 milliliters of an aqueous solution containing 0.74 grams of chloroplatinic acid and 0.6 milliliter of concentrated hydrochloric acid. The mixture was dried in air at 250° F. (121° C.) for 3 hours and then calcined in air at 1000° F. (538° C.) for 3 hours. The resulting calcined material contained 0.74 weight percent platinum and 0.70 weight percent chloride.

EXAMPLE 3

The procedure of Example 2 was repeated to make a solid support, except that 859 grams of Zeolon 100 were used, instead of the 11.7 grams thereof employed in Example 2, to make a solid support containing 60 weight percent of Zeolon 100 dispersed in alumina. After calcining, the support was ground to a particle size of 20-40 mesh, and 100 grams of the ground support was impregnated with an impregnating solution containing 6.8 grams of hydrated ammonium molybdate $[(NH_4)_6Mo_7O_{24}.6H_2O]$ and 3.4 grams of ammonium metatungstate in 150 milliliters of water, instead of the impregnating solution used in Example 2. After drying at 250° F. (121° C.) for 3 hours and calcining as in Example 2, the resulting impregnated support particles contained 5 weight percent of molybdenum oxide and 3 weight percent of tungsten oxide.

EXAMPLE 4

The procedure of Example 3 was repeated, except that the support was ground to a particle size of 14-18 mesh and 150 milliliters of an impregnating solution containing 1 gram of rhenium as perrhenic acid was employed, instead of the impregnating solution used in Example 3, to produce particles containing 1 weight percent of rhenium on a support containing 60 weight percent of Zeolon 100 dispersed in alumina.

EXAMPLE 5

The procedure of Example 4 was repeated, except that 150 milliliters of an impregnating solution containing 0.5 gram of gallium as gallium nitrate was used instead of the impregnating solution used in Example 4, to produce particles containing 0.5 weight percent of gallium oxide on a support containing 60 weight percent of Zeolon 100 dispersed in alumina.

EXAMPLES 6-11

Each of the catalysts prepared in Examples 1-5 was tested in a bench-scale pilot unit for its reforming ability. The same feedstock was used in each case. The feedstock was a partially reformed hydrocarbon fraction having a low sulfur content of less than about 2 parts per million by weight and having the properties presented in Table 1. The feedstock was obtained from a commercial reforming unit in which were employed conventional reforming conditions and a conventional reforming catalyst comprising from about 0.1 to about 1 weight percent of platinum, from about 0.1 to about 2 weight percent of rhenium and from about 0.1 to about 1 weight percent of chloride deposed on alumina particles having a mesh size of from about 0.031 inch (0.0787 cm.) to about 0.188 inch (0.477 cm.) in the largest dimension.

Catalysts were tested in a bench scale test unit employing a tubular fixed-bed reactor. In this unit, a mixture of preheated hydrocarbon feedstock and hydrogen was passed over a small sample of the catalyst being studied. Hydrogen was obtained from a bottled cylinder and the hydrocarbon feed was pumped into the reactor by a positive-displacement Ruska pump.

The reactor had an internal diameter of 0.622 inch (1.58 cm.) and was 20 inches (50.8 cm.) long. The catalyst bed, which occupied from about 5 inches (12.7 cm.) to about 7 inches (17.8 cm.) of reactor length, was supported on a layer comprising 3 cubic centimeters of glass beads. The reactor was immersed in an isothermal heating bath containing DuPont HITEC. Temperatures in the reactor were determined by employing a traveling thermocouple along the reactor axis. The average reaction temperature was reported as the kinetic average temperature of the catalyst bed.

TABLE 1
PROPERTIES OF FEED

| | |
|---|---|
| Gravity, °API | 48.9 |
| Specific Gravity | 0.7844 |
| Research Octane No. (Clear) | 87.4 |
| ASTM Distillation, °F. (°C.) | |
| IBP | 118 (48) |
| 10 vol. % | 188 (87) |
| 30 vol. % | 230 (110) |
| 50 vol. % | 256 (124) |
| 70 vol. % | 284 (140) |
| 90 vol. % | 324 (162) |
| EBP | 398 (203) |
| Hydrocarbon type, vol. % | |
| Paraffins | |
| $C_4$ and lighter | 0.34 |
| $C_5$ | 4.35 |
| $C_6$ | 5.94 |
| $C_7$ | 12.95 |
| $C_8$ | 12.89 |
| $C_9$ | 6.17 |
| $C_{10}$ | 1.77 |
| $C_{11}$ | 0.50 |
| total | 44.91 |
| Naphthenes | |
| $C_6$ | 1.26 |
| $C_7$ | 0.77 |
| $C_8$ | 0.61 |
| $C_9$ | 0.27 |
| $C_{10}$ | 0.21 |
| total | 3.12 |
| Aromatics | |
| benzene | 2.18 |
| toluene | 12.74 |
| xylenes and ethylbenzene | 16.82 |
| $C_9$ | 13.45 |
| $C_{10}$ | 4.17 |
| $C_{11}$ | 0.77 |
| $C_{12}$ and above | 0.0 |
| indans and tetralins | |
| indan | 0.51 |
| $C_{10}$ | 0.48 |
| $C_{11}$ | 0.15 |
| $C_{12}$ | 0.0 |
| total | 1.13 |
| naphthalenes | |
| naphthalene | 0.30 |
| methylnaphthalenes | 0.28 |
| $C_{12}$ | 0.13 |
| $C_{13}$ | 0.0 |
| $C_{14}$ | 0.0 |
| total | 0.71 |
| total | 51.97 |

The effluent from the reactor was sent to conventional product handling and recovery equipment. The liquid product was collected in a product receiver equipped with a condenser, and the hydrogen rich off-gas was continuously vented. For weight balance information, the liquid and gas product samples were collected for one hour and analyzed by means of gas-chromatographic techniques. The research clear octane number of the liquid product was determined by means of a mass spectrometric technique.

After the reactor was placed in the test unit, the catalyst was pretreated in situ by being subjected to an air soak for one-half hour at an air flow rate of about 2 cubic feet (57 liters) per hour, a temperature of about 900° F. (482° C.), and a pressure of 200 psia (14.6 atmospheres). Subsequently, the reactor was purged with nitrogen and then the catalyst was reduced with hydrogen at the test temperature and pressure. For the catalyst containing rhenium, the catalyst was pre-sulfided prior to the reduction with hydrogen. The pre-sulfiding was accomplished by flowing about one cubic foot (28 liters) of a gas mixture of 8 volume percent hydrogen sulfide in hydrogen at the test temperature and pressure. The catalyst loading was in the range of 13–17 grams. When the unit was placed on test, no sampling was performed for the first five hours to permit the test to line out.

The catalyst employed in Example 6 was 13 grams of the particles produced in Example 1. The catalyst employed in Example 7 was 13 grams of the particles produced in Exmple 2. The catalyst employed in Example 8 was 18 grams of the particles produced in Example 3. The catalyst system used in each of Examples 9 and 10 was a layer of a mixture of 7 grams of the particles produced in Example 1 and 4 grams of the particles produced in Example 4, disposed beneath and downstream of a layer of 6 grams of the particles produced in Example 1. The catalyst system employed in Example 11 was a layer of a mixture of 7 grams of the particles produced in Example 1 and 4 grams of the particles produced in Example 5, disposed beneath and downstream of a layer of 6 grams of the particles produced in Example 1.

The conditions employed in and results from Examples 6–11 are indicated in Table 2.

The results in Table 2 illustrate that the use of the catalyst systems of the present invention in Examples 9–11 resulted in liquid products having higher research octane numbers relative to the use of the conventional platinum-on-alumina catalyst in Example 6, as well as to the catalyst of Example 8. These improved octane values resulted even though the reforming temperatures in Examples 9–11 were lower than the reforming temperature in Examples 6 and 8 and the WHSV in Example 10 was higher than the WHSV of Example 6.

TABLE 2

| Example | 6 | 7 | 8 |
|---|---|---|---|
| Reforming Conditions | | | |
| Pressure, psia | 215 | 215 | 215 |
| (atm.) | (14.6) | (14.6) | (14.6) |
| Kinetic average temperature, °F. | 897 | 897 | 894 |
| (°C.) | (481) | (481) | (479) |
| WHSV | 3.62 | 3.62 | 2.68 |
| Hydrogen addition rate, SCFB | 3520 | 3120 | 4310 |
| (liters of hydrogen per liter of feed) | (627) | (556) | (768) |
| Light Gaseous Products | | | |
| $C_1$–$C_3$ yield[1] | 3.1 | 5.3 | 6.9 |

TABLE 2-continued

| | | | |
|---|---|---|---|
| $C_3/(C_1-C_3)$ yield selectivity | .58 | .68 | .56 |
| $i-C_4/n-C_4$ yield selectivity | .92 | 1.28 | 1.38 |
| $C_{5+}$ Liquid Products | | | |
| $C_{5+}$ yield[1] | 94.2 | 86.2 | 88.2 |
| Relative Catalyst Selectivity | 100 | 94.8 | 93.3 |
| Research Octane Number | 96.7 | 100 | 96.4 |
| Relative Catalyst Activity | 1.0 | 2.3 | 0.8 |
| Aromatic Products | | | |
| Aromatics yield[1] | 63.7 | 63.8 | — |
| Benzene yield[1] | 2.8 | 3.2 | — |
| $C_8$ aromatics yield[1] | 20.5 | 20.1 | — |

| Example | 9 | 10 | 11 |
|---|---|---|---|
| Reforming Conditions | | | |
| Pressure, psia | 215 | 215 | 215 |
| (atm.) | (14.6) | (14.6) | (14.6) |
| Kinetic average temperature, °F. | 833 | 852 | 833 |
| (°C.) | (445) | (456) | (445) |
| WHSV | 2.77 | 5.54 | 2.77 |
| Hydrogen addition rate, SCFB | 4380 | 3310 | 4620 |
| (liters of hydrogen per liter of feed) | (780) | (590) | (822) |
| Light Gaseous Products | | | |
| $C_1-C_3$ yield[1] | 7.0 | 4.9 | 7.5 |
| $C_3/(C_1-C_3)$ yield selectivity | .77 | .80 | .74 |
| $i-C_4/n-C_4$ yield selectivity | 1.63 | 1.50 | 2.00 |
| $C_{5+}$ Liquid Products | | | |
| $C_{5+}$ yield[1] | 85.9 | 88.4 | 83.6 |
| Relative Catalyst Selectivity | 96.1 | 96.4 | 96.4 |
| Research Octane Number | 101.1 | 99.3 | 102.8 |
| Relative Catalyst Activity | 40.7 | 17.6 | 54.9 |
| Aromatic Products | | | |
| Aromatics yield[1] | 65.0 | 64.7 | 66.2 |
| Benzene yield[1] | 3.9 | 3.4 | 4.1 |
| $C_8$ aromatics yield[1] | 22.1 | 21.9 | 22.5 |

[1]Weight percent, based on liquid feed.

Although use of the catalyst containing platinum deposed on a mixture of crystalline aluminosilicate and alumina in Example 7 also resulted in a liquid product having a higher research octane number relative to the liquid product of Example 6, the catalyst systems of this invention used in Examples 9-11 displayed very substantially higher relative catalyst activities over the catalyst employed in Example 7 as well as the catalysts employed in Examples 6 and 8. The relative catalyst activity indicated in Table 2 is a measure of the ability of a catalyst to increase the octane number of the liquid products having at least five carbon atoms, relative to the conventional platinum-on-alumina catalyst utilized in Example 6 and can be calculated from the reforming conditions and measured research octane number of liquid products having at least five carbon atoms. Thus, the higher relative catalyst activities of the catalyst systems of this invention used in Examples 9-11, relative to the conventional catalyst of Example 6 and to the catalysts used in Examples 7 and 8, signify that, when using the catalyst system of this invention, either a reformate having a higher research octane number will result under a given set of reforming conditions, or less severe reforming conditions can be used to produce a reformate having a given research octane number, than if the catalysts used in Examples 6-8 were used.

The results in Table 2 in Examples 9-11 relative to those for Example 6 also indicate that production of a liquid product of improved octane value by means of use of the catalyst system of this invention is accompanied by reduced $C_{5+}$ yields. In Table 2, the yield of liquid products having at least five carbon atoms, which includes all of the aromatic products, is indicated by the $C_{5+}$ yield. However, despite such reductions, decreases of the relative catalyst selectivities for Examples 9-11 relative to the relative catalyst selectivity for Example 6 are not excessive, and in fact, the relative catalyst activities for Examples 9-11 are higher than those for Examples 7 and 8. The relative catalyst selectivity indicated in Table 2 is the ratio of the $C_{5+}$ yield for each of the catalysts used in Examples 7-11 to the $C_{5+}$ yield for the conventional catalyst of Example 6, multiplied by 100, where these yields are both obtained under conditions such that reformates of the same research octane number are produced. Thus, the lower relative catalyst selectivities for the catalyst systems of this invention used in Examples 9-11 relative to the conventional catalyst used in Example 6 means that, where reformates of the same research octane number are produced, a relatively lower $C_{5+}$ yield and a relatively higher yield of gaseous products will be obtained when the catalyst system of this invention is employed that when the conventional catalyst used in Example 6 is employed.

Moreover, despite the increased yields of gaseous products in Examples 9-11 over the yield of gaseous products in Example 6, the proportions of liquefiable propane and of isobutane in such gaseous products were greater in Examples 9-11 than in Example 6 or in Examples 7-8. Thus the relative yields of these more valuable gaseous products increased when the catalyst systems of the present invention were employed.

Furthermore, the reduced $C_{5+}$ yields for the catalyst systems of this invention relative to that for the conventional platinum-on-alumina catalyst were not accompanied by reduced aromatics yields. On the contrary, the yields of aromatics generally, and of the more valuable benzene and $C_8$ aromatics particularly, in Examples 9-11 were significantly improved over the corresponding yield in Example 6 as well as in Example 7. The relative increases in the yields of benzene and xylenes is a clear manifestation of the greater activity of the catalyst system of this invention in promoting disproportionation, transalkylation and dehydrocyclization reactions and thereby in altering the aromatic composition of the reformate.

The results in Table 2 illustrate the surprising benefits made possible by the separation of the noble metal component from the crystalline aluminosilicate component in the catalyst system of this invention. For example, comparison of the results in Table 2 illustrates that, when (as in Example 2) 2 weight percent of crystalline aluminosilicate are added to the conventional platinum-chloride-on-alumina catalyst, although a 100 research octane number reformate is produced and the relative yields of propane and isobutane are increased compared to those for the conventional catalyst, a relative catalyst selectivity of 94.8 and a relative catalyst activity of only 2.3 result, and the aromatic product content remains essentially unchanged relative to that for the conventional catalyst. However, when (as in Examples 9-11) the catalyst system of this invention is employed having a greater crystalline aluminosilicate content but having the crystalline aluminosilicate separated from the noble metal component therein, not only is a high (101.1, 99.3, 102.8) research octane number reformate produced, but also (1) the relative yields of propane and isobutane are even more greatly increased compared to those for the conventional catalyst, (2) a high (96.1 and 96.4) relative catalyst selectivity and an extremely high (40.7, 17.6, 54.9) relative catalyst activity are obtained, and (3) the aromatics yields and specifically the yields of xylenes and benzene increase substantially relative to those for the conventional catalyst.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A hydrocarbon conversion catalyst system comprising a physical particle-form mixture of first and second catalysts, the first catalyst comprising at least one noble metal component and a combined halogen deposed on a high-surface area, porous refractory inorganic oxide and being free of a crystalline aluminosilicate component, and the second catalyst being free of a noble metal component and comprising at least one metal component deposed on a solid support comprising a crystalline aluminosilicate zeolite having an alkali metal content of less than about 1 percent of its weight, and being dispersed in a high surface area, porous refractory inorganic oxide; each noble metal component in the first catalyst comprising a noble metal, a compound thereof or a mixture thereof; each metal component in the second catalyst consisting essentially of a member selected from the group consisting of chromium, gallium, germanium, indium, lead, manganese, rhenium, technetium, thallium, tin, tungsten, a compound thereof and a mixture thereof; the weight percent of each noble metal component in the first catalyst, calculated as the noble metal element therein and based on the weight of the first catalyst, being in the range of from about 0.1 to about 1; the weight percent of each combined halogen in the first catalyst, calculated as the halogen element therein and based on the weight of the first catalyst, being in the range of from about 0.1 to about 1; the weight percent of each metal component in the second catalyst, calculated as the metal element therein and based on the weight of the second catalyst, being in the range of from about 0.1 to about 5; the weight percent of crystalline aluminosilicate zeolite in the second catalyst, based on the weight of the second catalyst, being in the range of from about 1 to about 80; and the weight ratio of the first catalyst to the second catalyst being in the range of from about 1:1 to about 10:1.

2. The catalyst system of claim 1 wherein at least one noble metal component in the first catalyst comprises platinum, a compound thereof or a mixture thereof.

3. The catalyst system of claim 1 wherein the weight percent of each noble metal component, calculated as the noble metal element therein and based on the weight of the first catalyst, is in the range of from about 0.2 to about 0.8.

4. The catalyst system of claim 1 wherein at least one combined halogen is chloride.

5. The catalyst system of claim 1 wherein the weight percent of each combined halogen, calculated as the halogen element therein and based on the weight of the first catalyst, is in the range of from about 0.2 to about 0.8.

6. The catalyst system of claim 1 wherein the porous refractory inorgnic oxide in the first catalyst is alumina.

7. The catalyst system of claim 1 wherein each metal component in the second catalyst consists essentially of a member selected from the group consisting of rhenium, gallium, tungsten, compounds thereof and mixtures thereof.

8. The catalyst system of claim 7 wherein each metal component in the second catalyst consists essentially of a member selected from the group consisting of rhenium, compounds thereof and mixtures thereof.

9. The catalyst system of claim 1 wherein the weight percent of each metal component in the second catalyst, calculated as the metal element therein and based on the weight of the second catalyst, is in the range of from about 0.5 to about 3.

10. The catalyst system of claim 1 wherein the alkali metal content of the crystalline aluminosilicate zeolite is achieved by cation-exchange of the crystalline aluminosilicate material.

11. The catalyst system of claim 10 wherein the crystalline aluminosilicate zeolite in the second catalyst particles is in the hydrogen-exchanged form.

12. The catalyst system of claim 1 wherein the crystalline aluminosilicate zeolite in the second catalyst comprises mordenite.

13. The catalyst system of claim 1 wherein the weight percent of crystalline aluminosilicate zeolite in the second catalyst is in the range of from about 2 to about 60, based on the weight of the second catalyst.

14. The catalyst system of claim 1 wherein the porous refractory inorganic oxide in the second catalyst is alumina.

15. The catalyst system of claim 1 comprising a physical mixture of (1) first particles comprising the first catalyst and free of the second catalyst and (2) second particles comprising the second catalyst and free of the first catalyst.

16. The catalyst system of claim 15 wherein the first particles have an average particle size in the range of from about 0.031 inch (0.079 cm.) to about 0.188 inch (0.48 cm.) in their largest dimension.

17. The catalyst system of claim 15 wherein the second particles have an average particle size of from about 0.031 inch (0.079 cm.) to about 0.188 inch (0.48 cm.) in their largest dimension.

18. The catalyst system of claim 15 wherein the first catalyst comprises a platinum-containing component and a chloride-containing component deposed on alumina, and wherein the second catalyst comprises a metal component consisting essentially of a member selected from the group consisting of rhenium, gallium, tungsten, a compound thereof and a mixture thereof, deposed on the solid support comprising cation-exchanged mordenite dispersed in alumina, and wherein the sizes of the first and second particles are the same or different and are each in the range of from about 0.031 inch (0.079 cm.) to about 0.188 inch (0.48 cm.) in their largest dimension.

* * * * *

UNITED STATES PATENT OFFICE
CERTIFICATE OF CORRECTION

Patent No. 4,418,006                                Dated November 29, 1983

Inventor(s) KIM, DAE K.  -  BERTOLACINI, RALPH J.

It is certified that error appears in the above-identified patent and that said Letters Patent are hereby corrected as shown below:

| Col. | Line | | |
|---|---|---|---|
| 11 | 56 | ...(336 liters...  should read  ...(337 liters... | |

Signed and Sealed this

Twenty-fourth Day of April 1984

[SEAL]

Attest:

GERALD J. MOSSINGHOFF

Attesting Officer     Commissioner of Patents and Trademarks